A. P. RUSSELL.
MACHINE FOR MAKING AND ATTACHING BAILS.
APPLICATION FILED MAR. 30, 1921.
1,435,336.
Patented Nov. 14, 1922.
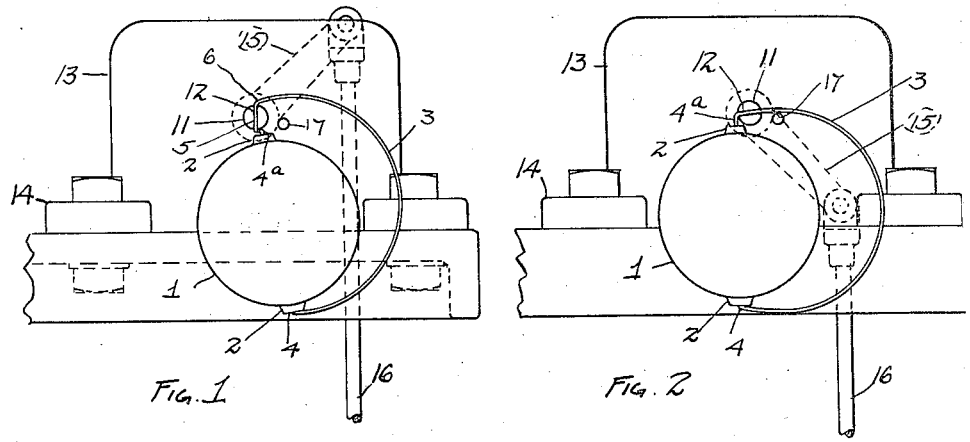
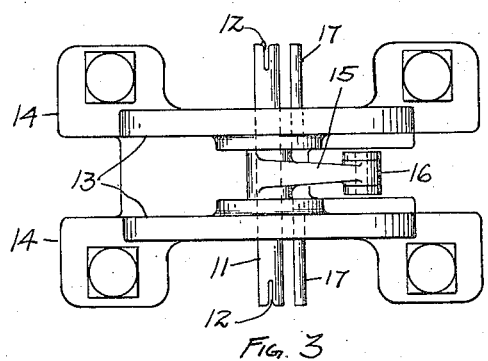
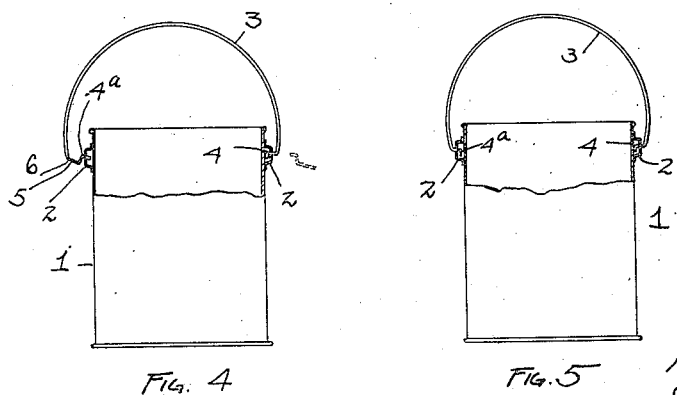
Inventor
Albert P. Russell
By Day, Oberlin & Day
Attorneys Patented Nov. 14, 1922.

1,435,336

UNITED STATES PATENT OFFICE.

ALBERT P. RUSSELL, OF CLEVELAND, OHIO, ASSIGNOR TO THE SHERWIN WILLIAMS COMPANY, OF CLEVELAND, OHIO, A CORPORATION OF OHIO.

MACHINE FOR MAKING AND ATTACHING BAILS.

Application filed March 30, 1921. Serial No. 457,089.

*To all whom it may concern:*

Be it known that I, ALBERT P. RUSSELL, a citizen of the United States, and a resident of Cleveland, county of Cuyahoga, and State of Ohio, have invented a new and useful Improvement in Machines for Making and Attaching Bails, of which the following is a specification, the principle of the invention being herein explained and the best mode in which I have contemplated applying that principle, so as to distinguish it from other inventions.

In my companion application filed March 18, 1921, Serial No. 453,498, I disclose a novel construction of bail and method of attaching same to containers whereby a bail with a reversed type of hook may be attached to ears previously soldered or otherwise fixedly secured to the sides of the containers. To this end the bail is provided with preformed reversely hooked ends, and the side portion of the bail adjacent one such end is bent so as to bring the extremity of such end into approximately right angled relation to such portion. The operation of attaching the bail then involves simply hooking the other end thereof into one such ear, entering the extremity of such first end into the other ear, and bending the adjacent side portion in question so as to bring the corresponding end into normal position, as a result causing it to interlock with the corresponding ear.

The object of the present invention is to provide a suitable device or machine for thus bending the bail portion, in effect, back into its normal condition so as to cause the corresponding end to engage with the ear which it has partially entered.

To the accomplishment of the foregoing and related ends, said invention, then, consists of the means hereinafter fully described, and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Fig. 1 is a side elevation of my improved device or machine showing a container with bail in the position it occupies with respect thereto preliminarily to operation of the machine; Fig. 2 is a similar view, but showing the position of parts of both the machine and of the article being operated upon after such operation; Fig. 3 is a plan view of the machine; and Figs. 4 and 5 are central sections more or less diagrammatic in character showing the several stages in the assembly of my improved bail, as exemplified in the operation of the foregoing machine.

The container 1 illustrated in the several figures of the drawing is shown as a cylindrical can or pail, to the outside of which, at opposite points near the upper end, have been soldered, or otherwise fixedly secured, ears or hollow stamped-up bosses 2 of usual form and construction. The bail 3 as preliminarily fashioned for attachment to the pair of ears on each such container, (see Figs. 1 and 4), has its one end formed with a reverse hook 4 of the sort hereinbefore mentioned as serving to securely interlock such end with the ear. Such end comprises, in effect, a transverse section bent substantially at a right angle to the adjacent side portion of the bail, while the extremity lies parallel with such side portion. Once such end is inserted, it is practically impossible to disengage the same from the ear, that is with the bail in its normal position with respect to the container body. However, with the other end of the bail free the end in question may be slipped into the corresponding ear, as indicated by the dotted position of the bail in Fig. 4.

The opposite end 5 of the bail comprises a terminal portion $4^a$ that corresponds with the rectangularly bent and parallel-disposed portions of the end 4 just described, but a supplemental inwardly projecting bend 6 in the bail, a short distance above such terminal portion $4^a$ has changed the angular relation of the portions in question so that the extremity in this stage of manufacture or assembly lies substantially at right angles to the corresponding side portions of the bail. Accordingly, after inserting the first mentioned end 4 in its corresponding ear, (and, incidentally to such insertion), the other end 5 is swung into alignment with the opposite ear, and in this position the extremity in question will freely enter the aperture in such last mentioned ear. Upon now straightening out the bend or kink 6 so as to restore or bring the corresponding side portion of the bail into its normal position, as illustrated in Figs. 2 and 5, the extremity of this end of the bail, and the portion next adjacent thereto, are brought into the same relation to such side portion and to the end of the ear as is already occupied by the corresponding parts of end 4.

The machine which I have devised for effecting such straightening comprises essentially an oscillatory member 11 provided with a diametral slot 12 across its end adapted to receive the portion of bail 3 lying between bend 6 and the terminal portion 4ᵃ proper. Said member, as shown, consists of a short spindle or shaft that is journaled in suitable bearings formed in two plates 13 rising from a suitable base 14. Preferably, shaft 11 projects beyond both such plates so that its respective ends may be similarly formed with slots 12, thus enabling two operations to be carried on simultaneously in conjunction with each such shaft. Oscillation of the shaft is designed to be effected by means of a lever 15 mounted thereon, such lever lying between the two plates 13 and having a rod 16 connected with its free end so that by pulling downwardly on such rod through the medium of treadle or other like device, not shown, the shaft will be rocked through an angle of approximately 90 degrees. Mounted adjacent to each end of the shaft, and on the right-hand side thereof, having regard to the direction of its movement in operation as just described, is a fixed pin or stop 17, located so as to engage the adjacent portion of the bail 3 as the bend or kink in such portion is straightened out by the oscillation of the shaft.

The machine, it will accordingly be seen, is simple, and all that the operator need do is to bring the portion of the preliminarily attached bail that lies between bend 6 and terminal portion 4ᵃ into engagement with slot 12 in the end of shaft 11. Thereupon, by oscillating said shaft, the adjacent side portion of the bail is bent downwardly against the pin 17 and such bend or kink 6 straightened out. At the same time the terminal portion 4ᵃ is brought into permanently interlocking relation with the ear 2. Upon removing the bail with the container, to which it is now attached, and returning the shaft 11 to its normal position, as shown in Fig. 1, the machine is ready for a second operation.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a machine of the character described, the combination with a suitable base of a shaft oscillatorily mounted thereon, each of the respective ends of said shaft being formed with a transverse slot, means adapted to oscillate said shaft to an angle of approximately 90°, and stops on said base located adjacent to such shaft ends respectively.

2. In a machine of the character described, the combination with a suitable base, two plates rising therefrom, a transversely disposed shaft journaled in said plates, the respective ends of said shaft projecting beyond the corresponding plates and each being formed with a transverse slot, a lever mounted on said shaft between said plates, and operating means connected with said lever whereby said shaft may be rocked through an angle of approximately 90°.

Signed by me, this 28 day of March, 1921.

ALBERT P. RUSSELL.